(12) United States Patent
Lee et al.

(10) Patent No.: US 6,223,276 B1
(45) Date of Patent: *Apr. 24, 2001

(54) PIPELINED PROCESSING OF SHORT DATA STREAMS USING DATA PREFETCHING

(75) Inventors: Hsien-Hsin Lee, El Dorado Hills; Vladimir Pentkovski, Folsom; Hsien-Cheng E. Hsieh, Gold River, all of CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,376

(22) Filed: Mar. 31, 1998

(51) Int. Cl.$^7$ ......................................... G06F 9/30
(52) U.S. Cl. ............................................. 712/207; 711/137
(58) Field of Search ...................... 711/137, 43; 712/207

(56) References Cited

U.S. PATENT DOCUMENTS 5,704,053 * 12/1997 Santhanam ......................... 712/207

* cited by examiner

Primary Examiner—William M. Treat
(74) Attorney, Agent, or Firm—Blakely, Sokoloff, Taylor & Zafman LLP

(57) ABSTRACT

The present invention discloses a method and apparatus for processing strips of data, each strip referencing a plurality of parameter sets stored in a memory. The method comprises: prefetching a plurality of parameter sets referenced in a first strip; performing an operation on each of the prefetched parameter sets; and concatenating a first strip and a second strip to eliminate a memory access latency in the second strip.

24 Claims, 5 Drawing Sheets

PIPELINED PROCESSING OF SHORT DATA STREAMS USING DATA PREFETCHING

BACKGROUND OF THE INVENTION

1. Field of the Invention

This invention relates in general to the field of computer systems, and in particular, to an apparatus and method for processing short data streams using data prefetching.

2. Description of Related Art

Pipelined processing has been popular in computer and microprocessor architectures. Pipelining improves overall throughput by overlapping independent operational stages. There are three types of pipelining: instruction, data, and computational. An instruction pipeline involves several stages in executing instructions, e.g., fetch, decode, operand, execute, and write-back. Computational pipelines typically involve several stages of a computation process, such as steps in multiplication algortihms. Data pipelines involve any form of overlapping of segments of a data stream.

Problems associated with pipelined architectures are well known. Some examples of these problems include data dependences, branch conditions, and latencies. Data dependences and branch conditions are relevant in an instruction pipeline. In all types of pipeline architectures, however, the latency problem is particularly significant.

Pipeline latency refers to the start-up delay caused by the time it takes to fill up the pipe before concurrent operations can begin to take place. For a fixed pipeline length, the effect of pipeline latency depends on the length of the data stream to be processed. If the data stream is much longer than the pipeline latency, the delay is negligible. However, for short data streams, the pipeline latency becomes a dominant factor and creates performance bottleneck.

The problem is even more pronounced in applications where there is an initial period for fetching data before processing the data. Examples of such applications include 3-D graphic and image processing, video conferencing, and scientific visualization.

Therefore, there is a need in the technology for providing an efficient method to process short data streams using pipelining.

SUMMARY OF THE INVENTION

The present invention discloses a method and apparatus for processing strips of data, each strip referencing a plurality of parameter sets stored in a memory. The method comprises: prefetching a plurality of parameter sets referenced in a first strip; performing an operation on each of the prefetched parameter sets; and concatenating a first strip and a second strip to eliminate a prefetch latency in the second strip.

BRIEF DESCRIPTION OF THE DRAWINGS

The features and advantages of the present invention will become apparent from the following detailed description of the present invention in which.

DESCRIPTION OF THE PRESENT INVENTION

A method and apparatus for performing an efficient pipelined processing of short data streams is disclosed. The method concatenates short strips of the data stream by pipelining memory accesses with prefetch instructions. As a result, the execution pipeline is optimized and produces fast execution rate. The invention provides an efficient technique to process short data streams.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Figure 1:
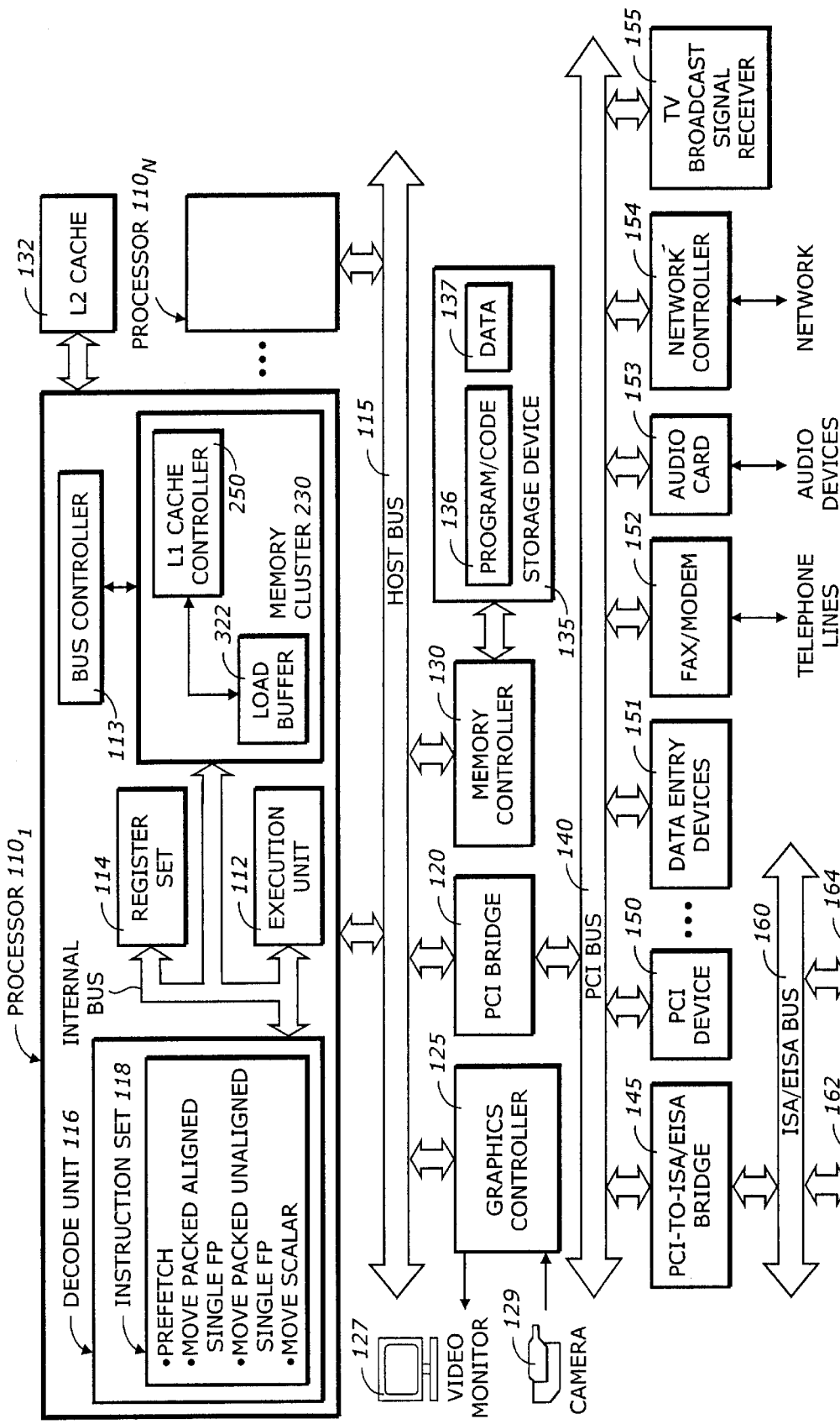
FIG. 1 is a diagram illustrating one embodiment of a computer system in accordance with the teachings of the present invention.

FIG. 1 is a diagram illustrating one embodiment of a computer system 100 in accordance with the teachings of the present invention. Computer system 100 comprises a number of processors $110_1$ through $110_N$, a bus bridge 120, an external cache (e.g., L2 cache) 132, and a memory controller 130.

Each of the processors $110_1$ through $110_N$ represents a central processing unit of any type of architecture, such as CIS, RISC, VLIW, or hybrid architecture. In addition, each of the processors $110_1$ through $110_N$ is capable of multiprocessing although this invention can be practiced without the requirement of multiprocessing capabilities. The processors $110_1$ through $110_N$ are coupled to the bus bridge 120 and the memory controller 130 via a host bus 115. While this embodiment is described in relation to a single processor computer system, the invention could be implemented in a multi-processor computer system.

The bus bridge 120 provides an interface between the host bus 115 and an expansion bus 140 (e.g., PCI bus). The bus bridge 120 (e.g., PCI bridge) also provides a graphic port, e.g., Accelerated Graphics Port (AGP), for connecting to a graphics controller 125. While one embodiment is shown that includes a graphic port, alternative embodiments can support graphics capture and display using any number of techniques. The graphics controller 125 is interfaced to a video monitor 127 and a camera 129. The video monitor 127 displays graphics and images rendered or processed by the graphics controller 125. The camera 129 acquires images and transfers and image data to the graphics controller 125.

The memory controller 130 provides an interface between the host bus 115 and a storage device 135. The storage device 135 represents one or more mechanisms for storing data. For example, the storage device 135 may include read only memory (ROM), random access memory (RAM), magnetic disk storage mediums, optical storage mediums, flash memory devices, and/or other machine-readable mediums. FIG. 1 also illustrates that the storage device 135 has stored therein data 137 and program/code 136. Data 137 represents data stored in one or more of the formats described herein. Program code 136 represents the necessary code for performing any and/or all of the techniques in the present invention. Of course, the storage device 135 preferably contains additional software (not shown), which is not necessary to understanding the invention.

The expansion bus 140 represents an expansion bus that allows the processors $110_1$ through $110_N$ to communicate with a number of peripheral devices. The expansion bus 140 provides an interface to an expansion-to-peripheral bridge 145 (e.g., PCI-to-ISA/EISA bridge), an expension device 150 (e.g., PCI device), a data entry device controller 151, a fax/modem controller 152, an audio card 153, a network controller 154, and a TV broadcast signal receiver 155.

The expansion-to-peripheral bridge 145 represents an interface device between the expansion bus 140 and an peripheral bus 160. The peripheral bus 160 represents a peripheral bus (e.g., ISA/EISA bus) that interfaces to a number of peripheral devices, including an ISA device 162 and an EISA device 164. The expansion device 150 represents any device that is interfaced to the expansion bus 140. The data entry interface 151 represents an interface to data entry devices such as tablet digitizer, mouse, etc. The fax/modem 152 represents a fax and/or modem for receiving and/or transmitting analog signals representing data. The audio card 153 represents one or more devices for inputting and/or outputting sound (e.g., microphones, speakers, magnetic storage devices, optical storage devices, etc.). The network controller 155 represents one or more network connections (e.g., an ethernet connection). The TV broadcast signal receiver 155 represents a device for receiving TV broadcast signals.

FIG. 1 additionally illustrates that the processor $110_1$ includes a decode unit 116, a set of registers 114, a bus controller 113, an execution unit 112, and an internal bus 111 for executing instructions. Of course, the processor 110 contains additional circuitry, which is not necessary to understanding the invention. The decode unit 116, registers 114 and execution unit 112 are coupled together by the internal bus 111. The bus controller 113 provides interface to the host bus 115 and an external cache 132 (e.g., L2 cache). The decode unit 116 is used for decoding instructions received by processor 110 into control signals and/or microcode entry points. In response to these control signals and/or microcode entry points, the execution unit 112 performs the appropriate operations. The decode unit 116 may be implemented using any number of different mechanisms (e.g., a look-up table, a hardware implementation, a PLA, etc.). While the decoding of the various instructions is represented herein by a series of if/then statements, it is understood that the execution of an instruction does not require a serial processing of these if/then statements. Rather, any mechanism for logically performing this if/then processing is considered to be within the scope of the implementation of the invention.

The decode unit 116 is shown including packed data instruction set 118 for performing operations on packed data. In one embodiment, the packed data instruction set 118 includes the following instructions: a prefetch, a move, a multiply, and an add. The number format for these operations can be any convenient format, including single-precision, double-precision, and extended floating-point numbers, signed and unsigned integers, and non-numeric data. In a preferred embodiment, the arithmetic operations use a single-precision 32 bit floating-point number format However, the arithmetic instructions may be applied to integer data as well. Furthermore, in one embodiment, the processor $110_1$ is a superscalar pipelined processor. In addition to the packed data instructions, the processor $110_1$ can include new instructions and/or instructions similar to or the same as those found in existing general purpose processors. For example, in one embodiment the processor $110_1$ supports an instruction set which is compatible with the Intel Architecture instruction set used by existing processors, such as the Pentium® processor manufactured by Intel Corporation of Santa Clara, Calif. Alternative embodiments of the invention may contain more or less, as well as different, packed data instructions and still utilize the teachings of the invention.

The registers 114 represent a storage area on processor $110_1$ for storing information, including control/status information, integer data, floating point data, and packed data. It is understood that aspects of the invention are the described instruction set for operating on packed data, as well as how those instructions are used. According to these aspects of the invention, the storage area used for storing the packed data is not critical. The term data processing system is used herein to refer to any machine for processing data, including the computer systems(s) described with reference to FIG. 1.

MEMORY PIPELINING WITH THE PREFETCH INSTRUCTION

Figure 2:
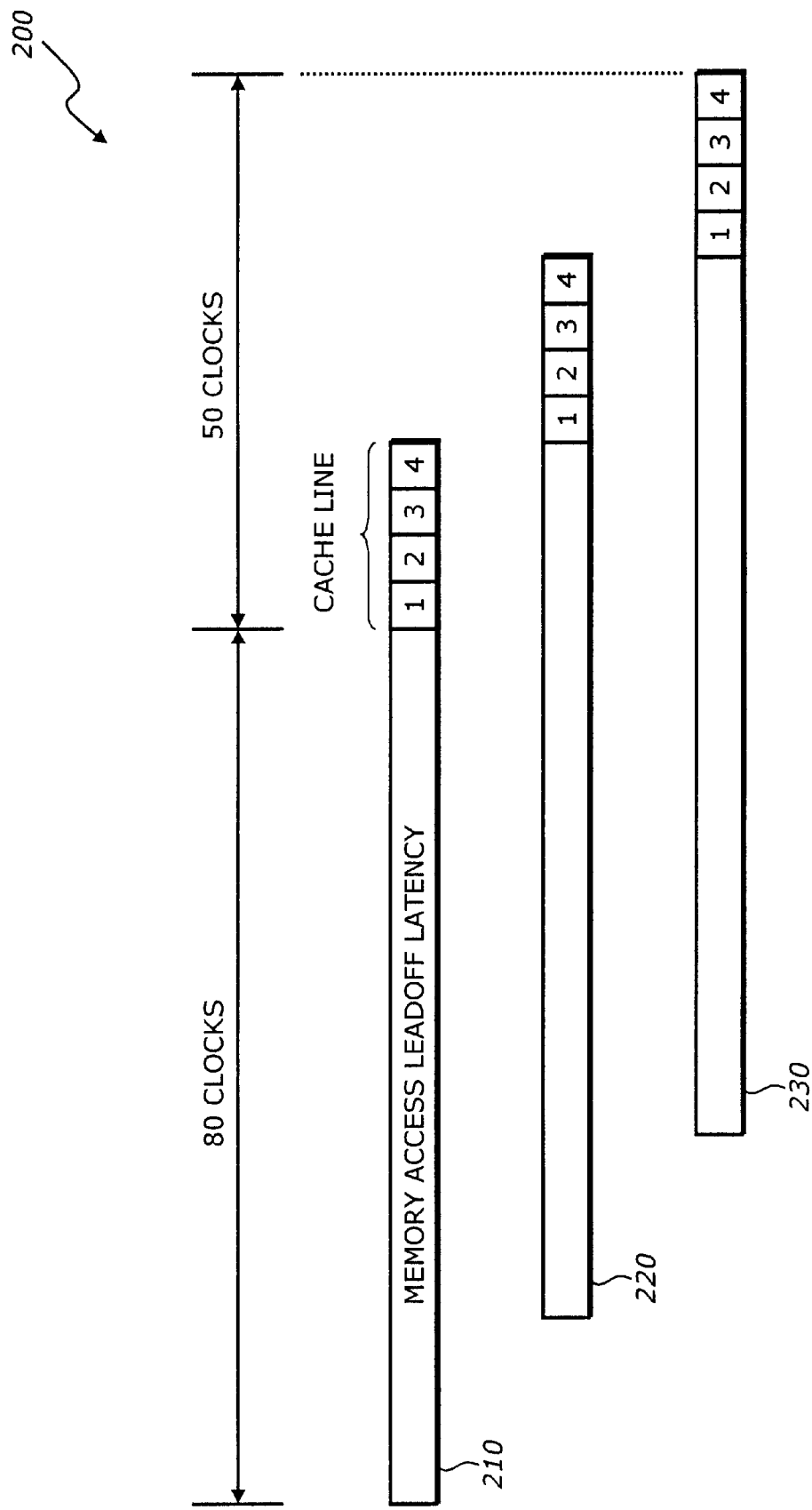
FIG. 2 illustrates a memory pipeline with cache look-up latency according to one embodiment of the invention.

FIG. 2 illustrates a processing block 200 using memory pipeline with cache look-up latency. The processing block 200 represents the processing time for one vertex in the short stream of operations, and includes three memory access segments 210, 220, and 230. It is assumed that these three segments correspond to the x, y and z components of the 3-D graphic transformation.

The memory access segments are overlapped in a pipeline manner. Each of the segment includes a memory access lead-off latency and the cache line access latency. The memory access lead off latency is the composite delay caused by memory processing such as cache line fills, cache miss, memory bank opening, etc. In the example shown in FIG. 2, the average value of the memery access lead-off latency is equal to 80 clock cycles. The cache line access latency in each segment includes the latency returned by the chunks within the cache line. In one embodiment, the cache line consists of 32 bytes and each chunk consists of 8 bytes. Therefore, a cache line has 4 chunks. In the example shown in FIG. 2, the total cache line access latency for three segments is equal to 50 clock cycles.

The Prefetch Instruction

The prefetch instruction moves the data closer to the processor in anticipation of future use. If there are no excepting conditions, the prefetch instruction fetches the line containing the addressed byte to a location in the cache hierarchy specified by a locality hint. If the line is already present in the cache hierarchy at a level closer to the processor, no data movement occurs.

Data prefetch timing has two characteristics: the initial latency of the fetch at the beginning of the data stream, and the rate of data stream prefetch in steady state. In steady state, the execution of the prefetch instructions can be fully pipelined. In long data streams, the fully pipelined execution provides high performance. However, when the data stream is short, the initial latency becomes predominant and creates performance bottleneck regardless of how high the prefetch rate is in the steady state.

Strip Concatenation Using Data Prefetching

For short data segments, referred to as short strips, the initial latency is significant. Even with data prefetching, this initial latency at each strip causes long average processing time.

Figure 3:
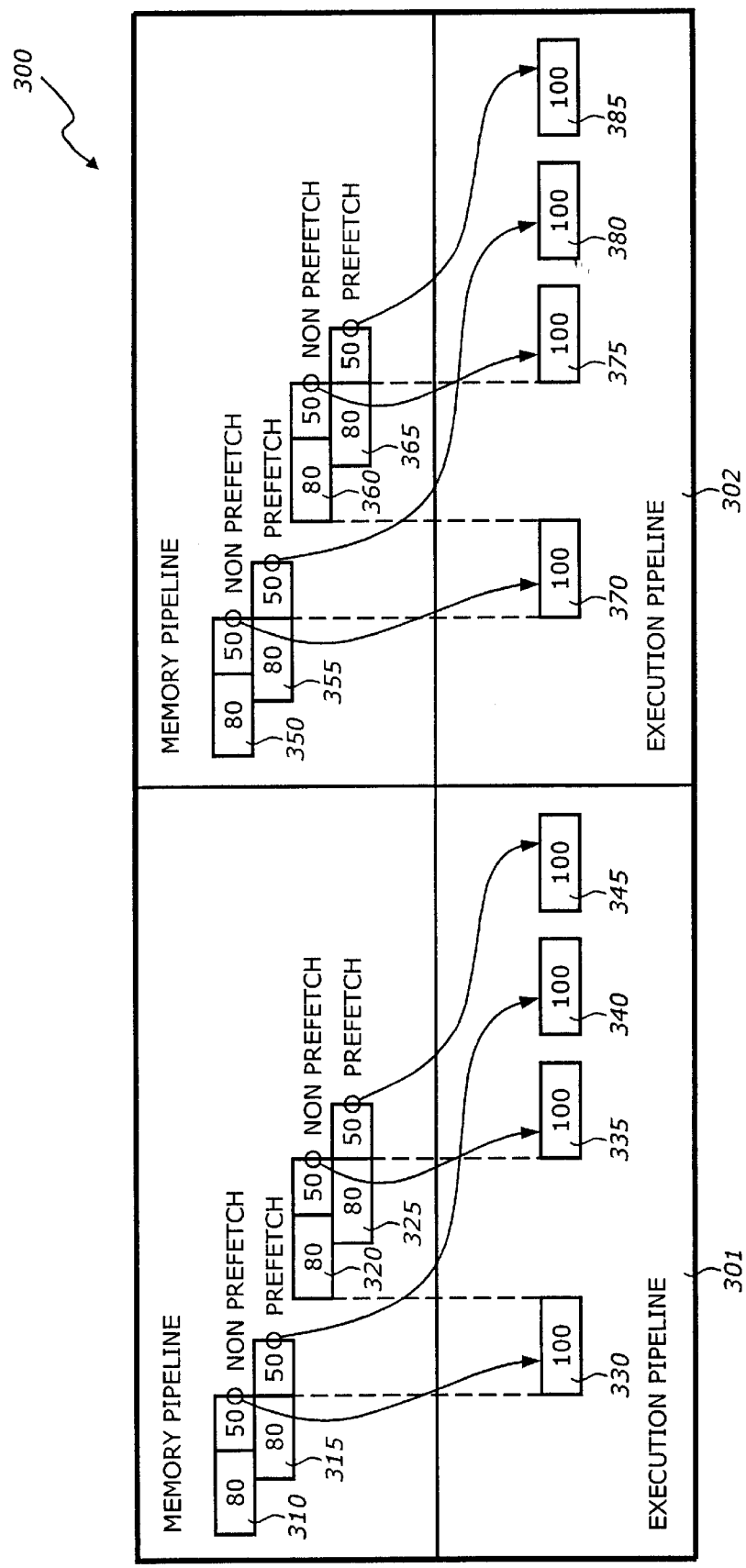
FIG. 3 illustrates de-pipelined memory accesses without strip concatenation according to one embodiment of the invention.

FIG. 3 illustrates de-pipelined memory accesses without strip concatenation according to one embodiment of the invention. In the example shown in FIG. 3, there are two strips 301 and 302. Each strip consists of 4 processing blocks. Strip 301 includes 4 processing blocks 310, 315, 320, and 325 in the memory pipeline, and 4 execution blocks 330, 335, 340, and 345 in the execution pipeline.

In the memory pipeline, each of the 4 processing blocks is assumed to require 80 clocks for the memory access latency and 50 clocks for the cache latency. These numbers are merely for illustrative purposes. Blocks 310 and 320 are regular load instructions while blocks 315 and 325 are prefetch instructions. In the execution pipeline, each of the four execution blocks requires 100 clocks. Memory processing blocks 310, 320, 315, and 325 result in execution blocks 330, 335, 340, and 345, respectively.

As seen in FIG. 3, strip 301 is a short strip having 4 processing blocks. The initial latency by the load instructions is dominant, occupying almost half of the processing time for the entire strip.

Similarly, strip 302 includes four processing blocks 350, 355, 360, and 365 in the memory pipeline, and four execution blocks 370, 375, 380, and 385 in the execution pipeline. Blocks 350 and 360 are regular load instructions while blocks 355 and 365 are prefetch instructions. Memory processing blocks 350, 360, 355, and 365 result in execution blocks 370, 375, 380, and 385, respectively.

Strip 302 starts processing at the strip boundary at the end of the strip 301. The initial latency due to the load instructions is repeated again in strip 302. Strip 302 therefore incurs the same initial latency by the prefetch instructions. The average execution latency can be computed by determine the overall execution time and dividing by the number of execution blocks in each strip.

Total execution time=(80+50+100)*2+100+100=660

Average execution time=660/4=165 clocks per execution block.

Pipelined Processing With Strip Concatenation and Data Prefetching

A data stream consisting of a large number of short data segments, or strips, is processed by a loop. Each loop has a number of iterations, and each iteration processes a parameter set. An example of a parameter set is a set of the x,y,z-coordinates of a vertex of a 3-D object in graphics. Strip concatenation is a technique to reduce the latency at the beginning of each strip by connecting the tail of the current strip in the current iteration with the beginning of the next strip in the next iteration. The technique is a partial loop unrolling to pipeline the memory accesses facilitated by data prefetching. This technique can be integrated into software pipelining optimization through compilers.

Figure 4:
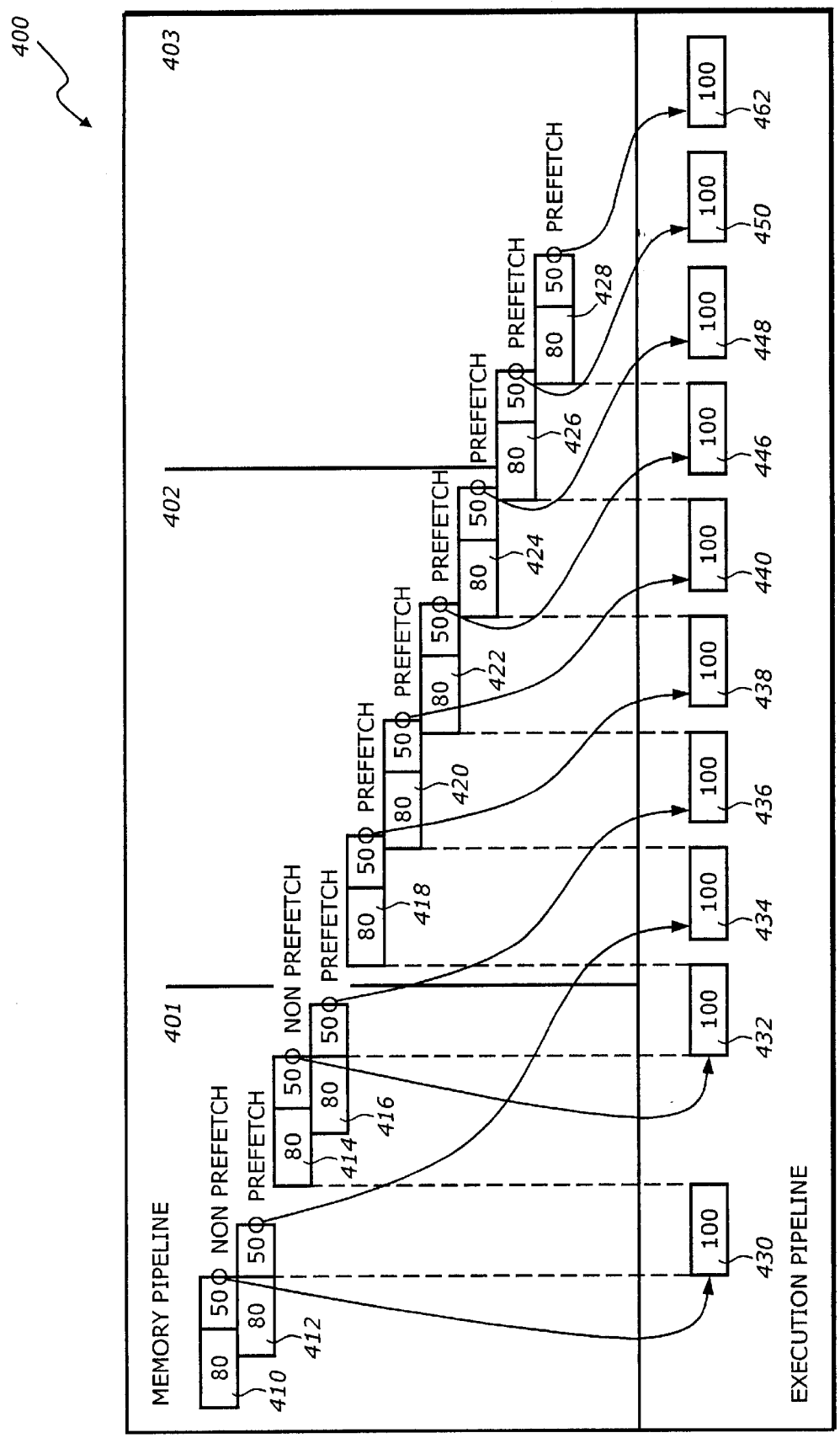
FIG. 4 illustrates fully pipelined memory accesses with strip concatenation according to one embodiment of the invention.

FIG. 4 illustrates fully pipelined memory accesses with strip concatenation. In the example shown in FIG. 4, there are 3 strips 401, 402, and 403.

In the memory pipeline, strip 401 includes processing blocks 410, 412, 414, 416; strip 402 includes processing blocks 418, 420, 422, 424; and strip 403 includes processing blocks 426, and 428. Blocks 410 and 414 are initiated by regular load instructions while blocks 412, 416, 418, 420, 422, 424, 426, and 428 are initiated by prefetch instructions. The execution pipeline includes execution blocks 430, 432, 434, 436, 438, 440, 446, 448, 450 and 462. Memory processing blocks 410, 414, 412, 416, 418, 420, 422, 424, 426, and 428 result in execution blocks 430, 432, 434, 436, 438, 440, 446, 448, 450, and 462, respectively.

the strips 401, 402, and 403 are now concatenated within the loop. Except for the very first strip which cannot hide the latency of the load instructions, all subsequent strips use prefetch instructions to hide the memory latency behind execution. The initial latency at the beginning of each strip is now eliminated by the pipelining effect of the concatenated strips. As a result, the average execution time is very close to 100 clocks. Compared to the processing without strip concatenation, the strip concatenation technique achieves a 65% performance improvement in this example. The actual performance improvement depends largely on the length of the strip, for the 3-D graphic transformation, the performance depends on the number of vertices or triangles in each strip.

Figure 5:
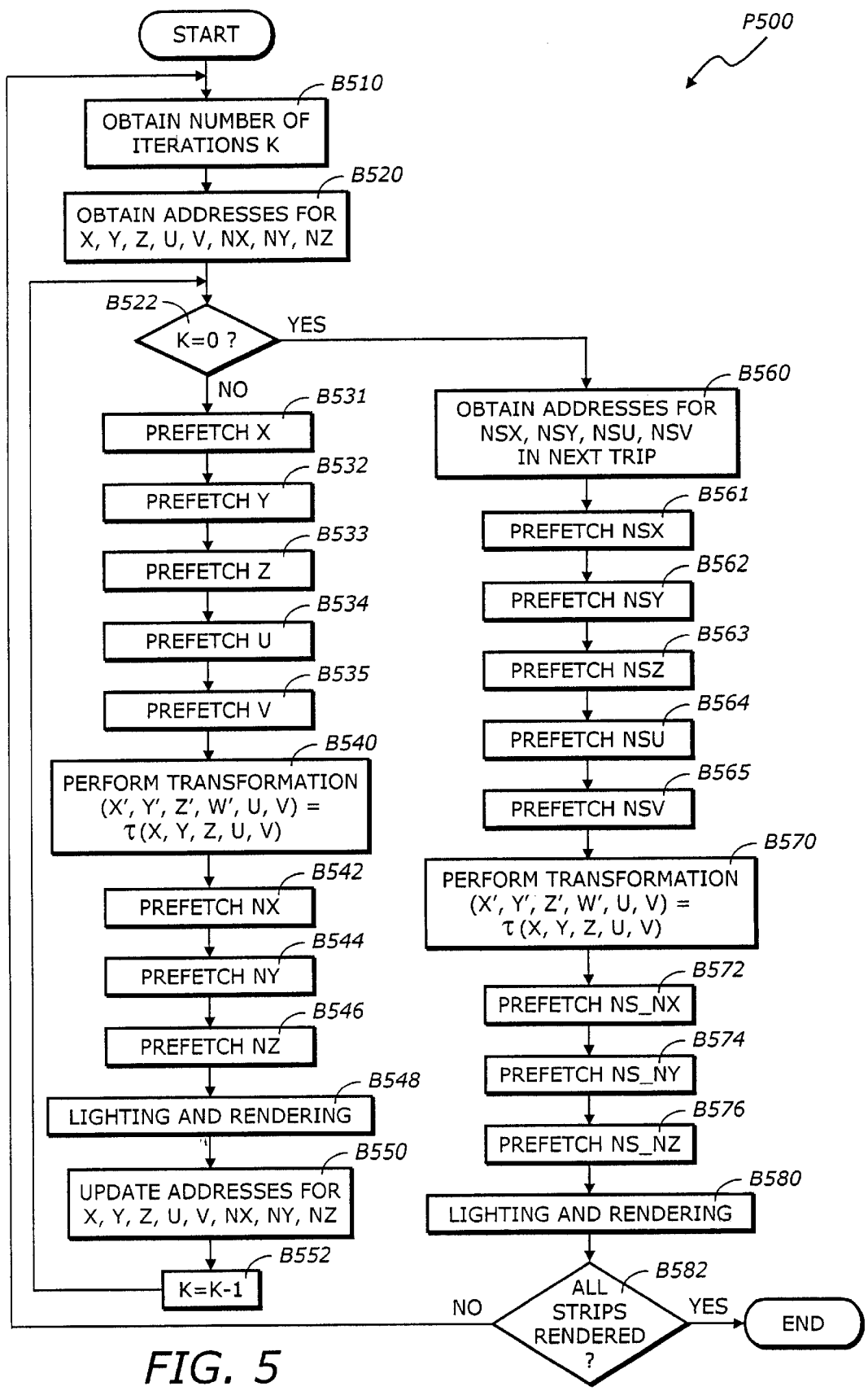
FIG. 5 is a flowchart illustrating a process to perform pipelined memory accesses with strip concatenation according to one embodiment of the invention.

FIG. 5 is a flowchart illustrating a process P500 to perform pipelined processing of a data stream using strip concatenation according to one embodiment of the invention. With reference to FIG. 1, the program code 122, when executed, would cause the method of FIG. 5 to be performed.

At START, the process P500 enters block B510 which obtains the number of iterations K. The number of iterations K is essentially the number of the vertices in a strip. The process P500 then enters block B520 to obtain addresses for the coordinates of the vertex, i.e., x, y, z, u, v, nx, ny, and nz. (x, y, z) are the coordinates of the vertex, (u,v) are the coordinates of texture mapping paremeters, (nx, ny, nz) are the components of the normal vector of the vertex.

The process P500 then enters block B522 to determine if the number of iterations is zero, i.e, if the current iteration is the last iteration. If YES, the process P500 enters block B560. If NO, the process P500 enters block B531.

The process P500 enters blocks B531, B532, B533, B534, and B535 to prefetch the values of the parameters x, y, z, u, and v from the memory. While these values are being prefetched, the process P500 enters block B540 to carry out the 3-D graphic transformation. Block B540 generates (x' y' z' w') as the transformed coordinates and passes (u,v) as vertex coordinates. The process P500 then enters blocks B542, B544, and B546 to prefetch nx, ny, and nz. Then the process P500 enters block B548 to perform lighting function and generate diffuse and specular colors (Cd, Cs). Then the process P500 sends (x' y' z' w' u v Cd Cs) to a graphic device for rendering. After the new vertex is rendered, the process P500 enters block B550 to update the addresses for x, y, z, U, v, nx, ny, and nz, to prepare for the next iteration. The loop counter is then decremented in block B552 and the process P500 returns to block B522.

In block B560, the addresses of the parameters of the first vertex in the next strip are obtained. Then the process P500 enters blocks B561, B562, B563, B564, and B565 to prefetch the values of the parameters nsx, nsy, nsz, nsu, and nsv from the memory. At the same time when these values are prefetched, the process P500 enters block B570 to carry out the 3-D graphic transformation. Block B570 generates (x' y' z' w' u v) as the transformed coordinates. The process P500 then enters blocks B572, B574, and B576 to prefetch ns_nx, ns_ny, and ns_nz. Then the process P500 enters block B580 to perform lighting function as in block B548 to render the new vertex of the last iteration for the current strip. After the new vertex is rendered, the process P500 enters block B582 to determined if all the strips have been processed. If NO, the process P500 returns to block B510 to obtain the number of vertices in the next strip. If YES, the process P500 is terminated.

The present invention discloses a method to optimize the processing of short stream of data by concatenating the strips. The method uses pipelining in prefetching the data. The result is a very fast processing time for the overall loop of strips of data.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   prefetching a plurality of parameter sets referenced in a first strip of data in a current iteration;
   performing an operation on each of the prefetched parameter sets; and
   concatenating the first strip and a second strip of data in a next iteration to eliminate a memory access latency in the second strip.

2. The method of claim 1 wherein prefetching the parameter sets comprises transferring the parameter sets from the memory to a cache.

3. The method of claim 1 wherein concatenating the first strip and the second strip comprises:
   prefetching a plurality of parameter sets referenced in the second strip; and
   pipelining memory accesses of the prefetched parameter sets referenced in the first and second strips.

4. The method of claim 3 wherein pipelining memory accesses comprises accessing the prefetched parameter sets at an end of the first strip and a beginning of the second strip consecutively.

5. The method of claim 1 wherein the parameter sets include coordinates, texture coordinates, and normal vectors of vertices of a graphic object.

6. The method of claim 1 wherein the operation is one of a three-dimensional (3-D) graphic transformation and lighting.

7. The method of claim 1 wherein each strip references a small number of parameter sets.

8. The method of claim 1 further comprising performing a non-prefetching memory access to at least one of the plurality of parameter sets.

9. An apparatus comprising:
   a memory; and
   a processor coupled to the memory, the processor executing a sequence of instructions to at least
   prefetch a plurality of parameter sets referenced in a first strip of data in a current iteration,
   perform an operation on each of the prefetched parameter sets, and
   concatenate the first strip and a second strip of data in a next iteration to eliminate a memory access latency in the second strip.

10. The apparatus of claim 9 wherein the processor prefetching the parameter sets transfers the parameter sets from the memory to the cache.

11. The apparatus of claim 9 wherein the processor, in concatenating the first strip and the second strip, executes a sequence of instructions to:
    prefetch a plurality of parameter sets referenced in the second strip; and
    pipeline memory accesses of the prefecthed parameter sets referenced in the first and second strips.

12. The apparatus of claim 11 wherein the processor, in pipelining memory accesses, further executes a sequence of instructions to access the prefetched parameter sets at an end of the first strip and a beginning of the second strip consecutively.

13. The apparatus of claim 9 wherein the parameter sets include coordinates, texture coordinates, and normal vectors of vertices of a graphic object.

14. The apparatus of claim 9 wherein the operation is one of a three-dimensional (3-D) graphic transformation and lighting.

15. The apparatus of claim 9 wherein each strip references a small number of parameter sets.

16. The apparatus of claim 9 wherein the processor further executes a sequence of instructions to perform a non-prefetching memory access to at least one of the plurality of parameter sets before prefetching the plurality of parameter sets referenced in the first strip.

17. A computer program product comprising:
    a computer usable medium having computer program code embodied therein, the computer program product having:
    computer readable program code for prefetching a plurality of parameter sets referenced in a first strip of data in a current iteration;
    computer readable program code for performing an operation on each of the prefetched parameter sets; and
    computer readable program code for concatenating the first strip and a second strip of data in a next iteration to eliminate a memory access latency in the second strip.

18. The computer program product of claim 17 wherein prefetching the parameter sets comprises computer readable program code for transferring the parameter sets from the memory to a cache.

19. The computer program product of claim 17 wherein the computer readable program code for concatenating the first strip and the second strip comprises:
    computer readable program code for prefetching a plurality of parameter sets referenced in the second strip; and
    computer readable program code for pipelining memory accesses of the prefetched parameter sets referenced in the first and second strips.

20. The computer program product of claim 19 wherein the computer readable program code for pipelining memory accesses comprises computer readable program code for accessing the prefetched parameter sets at an end of the first strip and a beginning of the second strip consecutively.

21. The computer program product of claim 17 wherein the parameter sets include coordinates, texture coordinates, and normal vectors of vertices of a graphic object.

22. The computer program product of claim 17 wherein the operation is one of a three-dimensional (3-D) graphic transformation and lighting.

23. The computer program product of claim 17 wherein each strip references a small number of parameter sets.

24. The computer program product of claim 17 further comprising computer readable program code for performing a non-prefetching memory access to at least one of the plurality of parameter sets.

* * * * *